Oct. 13, 1925.
C. GIRL
1,556,780
BUMPER FOR AUTOMOBILES
Filed Jan. 9, 1924
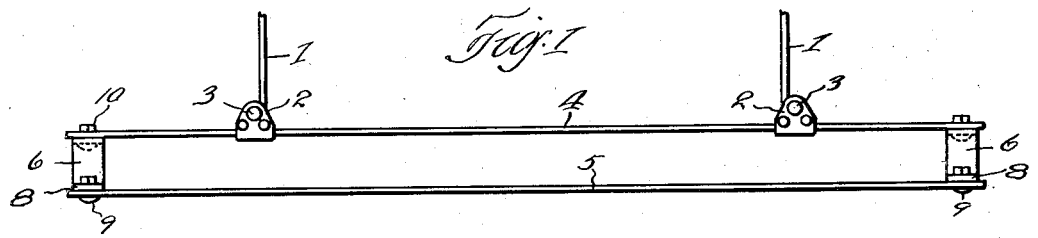
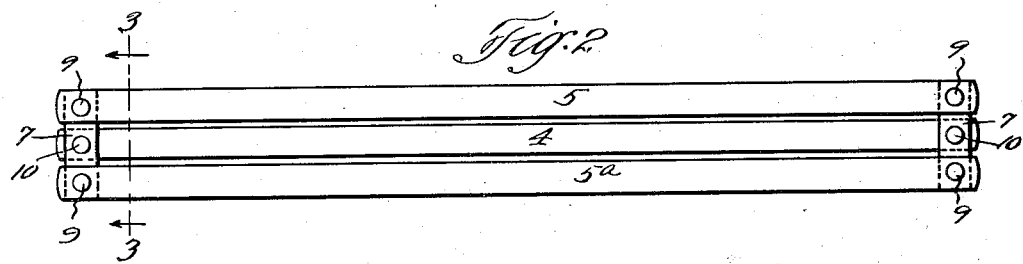
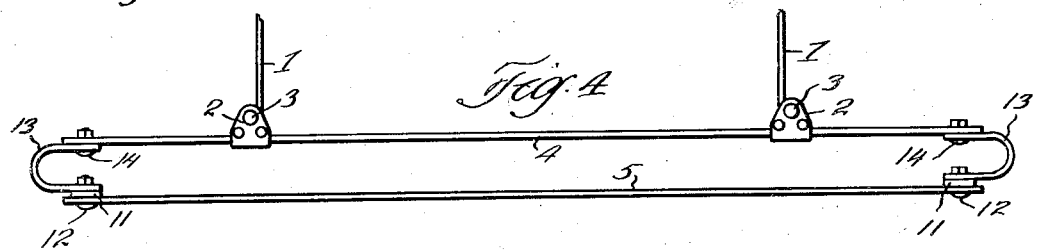
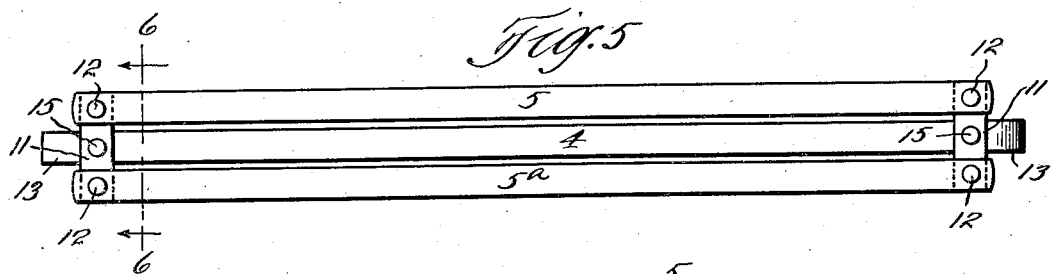
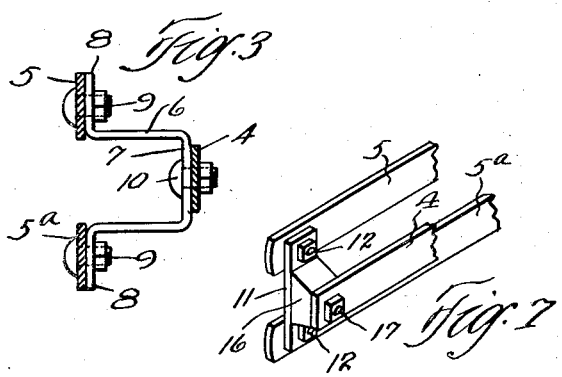
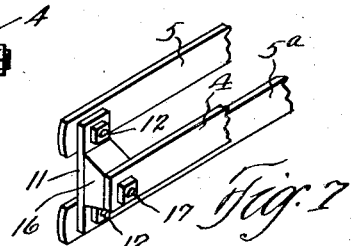
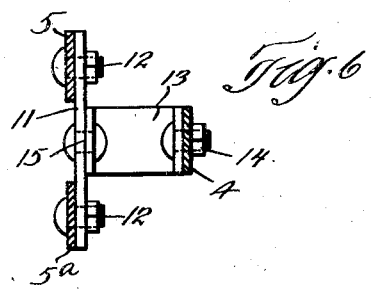
Inventor
Christian Girl
By Hull, Brock & West
Attys Patented Oct. 13, 1925.

1,556,780

UNITED STATES PATENT OFFICE.

CHRISTIAN GIRL, OF DETROIT, MICHIGAN, ASSIGNOR TO THE C. G. SPRING & BUMPER COMPANY, OF DETROIT, MICHIGAN, A CORPORATION OF DELAWARE.

BUMPER FOR AUTOMOBILES.

Application filed January 9, 1924. Serial No. 685,144.

*To all whom it may concern:*

Be it known that I, CHRISTIAN GIRL, a citizen of the United States, residing at Detroit, in the county of Wayne and State of Michigan, have invented a certain new and useful Improvement in Bumpers for Automobiles, of which the following is a full, clear, and exact description, reference being had to the accompanying drawings.

This invention relates to bumpers for automobiles and has for its general object not only to provide a bumper which will perform its functions in an efficient manner, but one which is inexpensive of production. I accomplish the foregoing object by means of the embodiments of my invention illustrated in the drawings forming part hereof, wherein Fig. 1 represents a plan view of one of such embodiments of my invention, together with portions of the supporting arms; Fig. 2 a front elevation of the bumper shown in the preceding view and Fig. 3 a detail section corresponding to the line 3-3 of Fig. 2; Figs. 4 and 5 are views, similar to Figs. 1 and 2 respectively, of another form of my invention; Fig. 6 a detail in section corresponding to the line 6-6 of Fig. 5; and Fig. 7 a detail in perspective of another form of resilient connection between the ends of the bumper bars or plate.

Describing the various parts by reference characters and alluding to Figs. 1-3 inclusive, 1, 1 denote a pair of supporting arms which are adapted to be attached to the side members (not shown) of an automobile. These arms are shown as connected by means of clamps 2 and vertical pivot bolts 3 to the rear bar 4 of the bumper. In addition to the rear bar 4, the bumper comprises a pair of parallel, vertically-spaced impact bars 5, 5ª, located in front of the bar 4 and positioned above and below the same respectively.

It will be observed that all three of the bars 4, 5 and 5ª are of the same length; that the bars 5 and 5ª are parallel with each other and in substantially the same vertical plane, while the bar 4 is in a substantially vertical plane parallel with the plane comprising the bars 5 and 5ª; that the ends of the said bars at one end of the bumper are in a common plane transverse to the length of the bumper, while the other ends of the bars, at the other end of the bumper, are also in a common plane transverse to the length of the bumper.

The ends of the bars at each end of the bumper are connected in the same manner, and a description of the connecting means employed at one end will suffice for both ends. Referring to Figs. 1, 2 and 3, it will be seen that the bars are connected and maintained in the relation heretofore described by means of a U-shaped member, in the form of a stirrup having flanged ends. Each such connecting member is preferably made of a resilient metal plate or strap and comprises a pair of spacing legs 6 and an intermediate body 7, the legs being provided with feet 8. The feet 8 are secured to the ends of the bars or plates 5, 5ª, preferably by means of carriage bolts 9, while the bar or plate 4 is secured to the body portion 7 of the connecting member, as by means of a similar bolt 10.

When the parts are assembled in the manner described, a bumper of the multiple-bar type is produced which is strong, capable of withstanding all ordinary incidents of use, and which can be manufactured and assembled in a very economical and convenient manner. The plates or bars 4, 5 and 5ª can be all cut to the same length; no forming or shaping of the bars will be necessary; and the assembling can be accomplished very quickly and conveniently. The manner of connecting the ends of the bars gives great strength to the corresponding portions of the bumper.

In Figs. 4, 5 and 6 there is shown a modification of my invention wherein the parts 1—5ª inclusive are identical with the like-designated parts on Figs. 1-3. For the purpose of connecting the ends of the bars I secure the ends of the bars 5 and 5ª together by means of vertical metal straps 11, preferably secured to such bars or plates by means of carriage bolts 12. The ends of the rear bar 4 are resiliently connected to the ends of the bars 5, 5ª by means of resilient U-shaped metal plates or straps 13, each secured to the appropriate end of the rear bar 4 by means of a carriage bolt 14 and to the central portion of the strap 11 by means of a rivet 15. The straps 13, being made of ordinary spring steel such as is employed in the bars 4, 5 and 5ª, will afford a yielding or resilient connection between the ends of the said bars or plates and each constitutes a looped end for the pumper.

In Fig. 7, there is shown a modified form of the resilient connection between the ends of the bars 4, 5 and 5ª. In this view, the parts 4, 5, 5ª, 11 and 12 are identical with the like-designated parts in Figs. 4–6. However, instead of interposing a resilient loop between the strap 11 and the bar 4, I employ a block 16 of resilient material, such as rubber, securing the block and the end of the plate 4 together and to the strap 11 by means of a bolt 17 extending through the plate, block, and strap.

Having thus described my invention, what I claim is:—

1. A bumper comprising a plurality of vertically spaced front or impact bars and a rear or auxiliary bar, the said bars being of the same length and arranged parallel with each other, and means additional to said bars for connecting the ends of the same.

2. A bumper comprising a plurality of vertically spaced front or impact bars and a rear or auxiliary bar, the said bars being of the same length and arranged parallel with each other, and means additional to said bars for resiliently connecting the ends of the same.

3. A bumper comprising an impact bar and an auxiliary bar, the said bars being of the same length and arranged parallel with each other, and means additional to said bars for resiliently connecting the ends of the same.

4. A bumper comprising a plurality of vertically spaced front or impact bars and a rear or auxiliary bar, the said bars being of the same length and arranged parallel with each other, and means resiliently connecting the ends of said bars, said means comprising a plate or strap secured to corresponding ends of the first two bars, and a resilient spacing member secured to said strap and to the corresponding end of the rear or auxiliary bar.

5. A bumper comprising a plurality of vertically spaced front or impact bars and a rear or auxiliary bar, the said bars being of the same length and arranged parallel with each other, and means resiliently connecting the ends of said bars, said means comprising a plate or strap connecting corresponding ends of the impact bars and a resilient looped member connected to said plate or strap and to the rear or auxiliary bar and providing a looped extension for the corresponding end of the bumper.

6. A bumper comprising a plurality of vertically spaced front or impact bars and a rear or auxiliary bar, the ends of said bars being spaced apart, the ends of said bars at each end of the bumper being located in a plane transverse to the lengths of said bars, and means additional to said bars for resiliently connecting the ends of the same.

7. A bumper comprising a pair of front or impact bars and a rear or auxiliary bar, the first mentioned bars being spaced from each other and from the third bar, said bars being in substantially parallel relation throughout their lengths, and a U-shaped member additional to said bars connected to and spacing corresponding ends of the same.

8. A bumper comprising an impact bar and an auxiliary bar, said bars having their ends spaced apart, the ends of said bars at each end of the bumper being located in a plane transverse to the lengths of said bars, and means additional to said bars for resiliently connecting the ends of the same.

In testimony whereof, I hereunto affix my signature.

CHRISTIAN GIRL.